July 11, 1944.  A. C. DAVIS  2,353,127

INSPECTION APPARATUS

Filed July 22, 1941  3 Sheets-Sheet 3

Inventor
ALLAN C. DAVIS

Patented July 11, 1944

2,353,127

UNITED STATES PATENT OFFICE 2,353,127

INSPECTION APPARATUS

Allan C. Davis, Baltimore, Md.

Application July 22, 1941, Serial No. 403,593

29 Claims. (Cl. 88—14)

In the bottling of beverages, particularly soft drinks, as now practiced, the filling of the bottles and the introduction of the bottles into the cases or cartons is wholly automatic, the filled bottles being delivered by the filling machine to a conveyor by which the bottles are in due course delivered to a case filling machine which, in turn, with the help of a second conveyor, delivers the filled cases at a point of loading.

According to the recent practice, the filled bottles on the conveyor between the bottle filling machine or mixing machine or the like and the caser or case filling machine have been inspected by transmitted light, i. e., at a suitable point in their path they are passed between an inspection light and the eyes of an inspector or a light sensitive device. The latter is not effective with products which are not uniformly transparent and it involves relatively elaborate and expensive apparatus.

The present invention relates to the optical type of apparatus and in this connection it is noted that the method of optical inspection above suggested as previously developed has proved unsatisfactory, the difficulties encountered as well as the defects incident to the result attained being of importance.

For example, the bottles on the conveyor, due to lack of uniform delivery from the filling machines are spaced apart by intervals of irregular length and the eyes of the inspector are, in the course of any inspection period, subject to the direct glare of the light for a total elapsed time which approaches and may be greater than the total time spent in actually viewing the bottles and their contents by the direct and diffused rays of light transmitted to the inspector's eyes from the source and passing first through the bottles and contents as intended. These conditions result in eye strain and incomplete and unsatisfactory inspection and also in loss of time and in extra expense for inspection. Even if the bottles in the line on the conveyor were as close together as conditions generally permit without regard to the filling operation there would still be light spaces between the bottles which would pass direct unfiltered rays from the inspecting light to the inspector's eyes and interfere with inspection and cause eye strain.

It is also noted that the speed of the bottle conveyor between the filler and caser or between the mixing machine and caser is normally too great for satisfactory inspection in this way, the main purpose in such conveyor operation being to avoid congestion and keep the machine supplied and in efficient operation. Further, as the bottles move in a straight line, the view of each bottle obtained by the inspector is confined to a single direction or substantially so.

While the patented art contains inspection apparatus for use in the inspection by transmitted light of bottled liquids and the like, such apparatus is either of the elaborate, expensive power operated type adapted to use mainly with photoelectric cells or it is manually operated or otherwise lacking in continuity of operation and efficiency. In the point of time and speed the solution of the problem, if any solution is attained by the prior patented apparatus, is not complete or satisfactory.

In the operation of the improved apparatus of the invention an important accomplishment is the limitation of the operation of the inspection apparatus to periods in which it is fully supplied with bottles, thus in the normal operation the openings in the inspection arc are kept filled. The desired result is found to be most easily and economically accomplished in and by an operation in which the actuating impulse is obtained solely from the bottles as they move along the conveyor from a bottle filling machine or a bottle shaking or mixing machine toward the caser. However, the inspection apparatus may be used with any suitable conveyor to inspect various articles having transparent qualities. The bottles on the conveyor, as received by the inspection apparatus, are as a rule, widely spaced, and it is regarded as an advantage of the apparatus that it can reduce the spaces between bottles and thus reduce the normal speed of the bottles without reducing the rate of delivery. This speed reduction is of advantage mainly in slowing the bottles down to a speed which is convenient for inspection.

While the use of the forward tendency of the bottles on the conveyor as the motive force by which the inspection apparatus is actuated is regarded as having important advantages, the fact that certain features of the invention are adapted for use under other conditions will be apparent as is also the fact that some features of the invention may be applied to the photo-electric type of apparatus.

The inspection apparatus, in the preferred form as shown, includes a cylindrical or other endless light intercepting screen which may for convenience be referred to as a drum, the same being mounted to rotate about an upright axis or otherwise mounted to move on a continuous endless path and having closely related openings each adapted to receive and hold a bottle or other transparent article to be inspected, the same being in upright position or other convenient attitude.

The conveyor passes beneath part of the drum or moving screen. In the instance of the cylindrical drum herein illustrated the conveyor moves on a path which is approximately a chord of the cylinder, said chord subtending an arc which may be about 60° or any suitable arc. The inspection light rays are preferably projected outwardly from a point near the center of the drum or other enclosure formed by the moving screen and a stationary screen is preferably provided which confines the rays to the said arc where the bottles are located and where inspection takes place. The bottle conveyor, the word bottle being used for convenience, to include other articles, extends beneath an arc of the drum serving as a bottom wall for said openings in said arc and keeps the openings in said arc, the chord of which is the conveyor path, filled with bottles. Preferably the thrust incident to the advancement of the bottles by the conveyor serves to rotate or otherwise to advance the screen and the bottles are or may be delivered to the drum and removed therefrom at the respective ends of said arc and said chord, variation as to form and control being contemplated. In the form shown, when the supply of bottles is insufficient to fill all openings in said arc, the inspection screen stops being preferably located in receiving position to be started automatically when a sufficient supply of bottles is presented.

In the preferred form, a speed control or governor may be provided to equalize the speed of the drum or other screen and to thus reduce any tendency of the apparatus to accumulate bottles on the conveyor up to a point where the control is tripped and to then dispose of the bottles at high speed too fast for convenient inspection and to then stop and repeat the cycle. More continuous operation of the inspection apparatus at a slower speed more convenient for inspection with only occasional stops to permit the bottle supply to "catch up" is desirable and herein referred to as preferred.

It has been found desirable to assist in keeping track of the number of bottles and/or the number of cases, to have the number of bottle seats or holes in the screen correspond to the number of bottles in a case so that by applying a counter to the screen motion the number of bottles and/or the number of cases may be indicated.

Important accomplishments are: slowing down of the bottles to a speed at which they can be efficiently inspected and at the same time closing the line so that there is actually no corresponding reduction of the rate of delivery; exclusion of the inspecting light rays from the inspector's eyes except insofar as these rays pass through the bottles and contents and thus serve their purpose in performing the inspection function; turning of the bottles in front of the inspector during the inspection so that they are viewed through a range of angularity; equalizing the bottle speed at the time of inspection; regulating the operation of the machine in accord with the supply of bottles with the minimum number of stops which are effected without shock; keeping the inspection arc where the conveyor and screen move on contacting paths full of bottles at all times; avoiding the entrance of free unimpeded or unfiltered light rays into the eyes of the inspector, and providing for concurrent counting of the bottles and filled cases; simplification of the operation and apparatus and improved control of the same by using the forward tendency of the bottles to run the machine.

In the accompanying drawings, I have illustrated what may be regarded as a simplified and also a preferred or more elaborate form of machine embodying my invention.

In the drawings.

Figure 1:
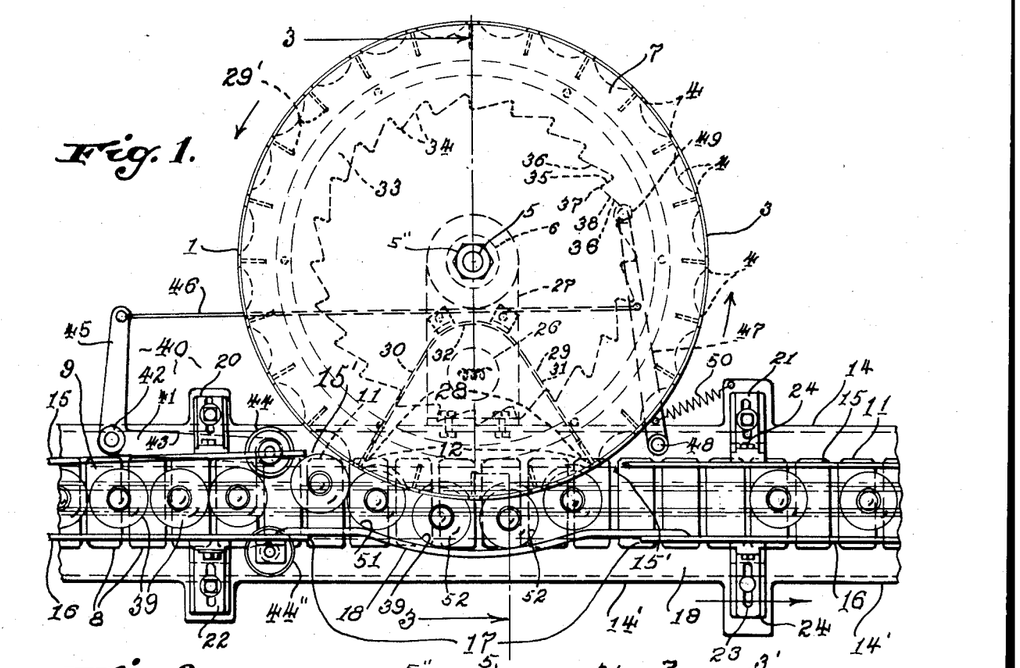
Fig. 1 is a top plan view of the simplified form of machine.
Figure 2:
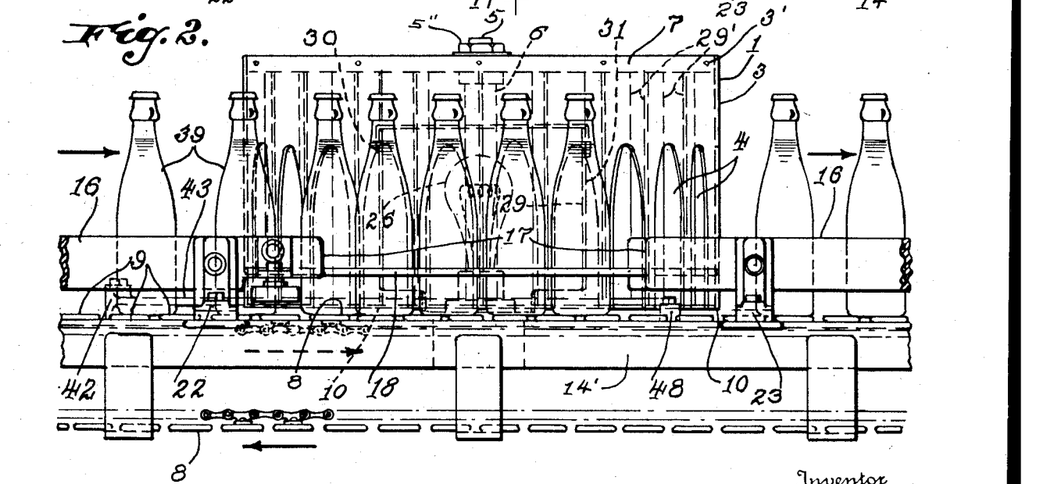
Fig. 2 is an elevation of the same looking from the side toward the observer in Fig. 1 which is also the direction from which the bottles are viewed by the inspector.

Referring to the drawings by numerals each of which is used to indicate the same or similar parts in the different figures and having particular reference to Figs. 1 and 2, the machine or inspection apparatus, as shown, includes a moving endless screen or drum 1 which, though it may be otherwise shaped, is shown as having upright side or screen walls 3, in the form of a cylinder and having closely related openings 4 to receive the bottles. In the form shown, these openings are shaped to fit and partially admit the bottles in upright position. The transmission of light through the screen at a suitable location, the means for positioning the articles relatively to the screen to receive the light and prevent its passage to the operator's eyes, otherwise than through the bottles, the positioning of the screen so that bottles are received in the opening and the maintenance of the bottles in all of the openings which are exposed to the operator's view are important features. The word drum is used for convenience. The construction shown is a circular endless screen mounted to rotate about a vertical axis on shaft 5 which is engaged by tubular bearing tube 6 mounted on the frame. By removing nut 5'', the drum may be removed. Rotation of the drum causes the screen to move on a predetermined path which is referred to in the claims as continuous and in the more specific claims as circular.

The drum, as shown, is provided with a circular top wall or plate 7 to which the sidewall 3 or screen proper is secured at the top at 3'.

Figures 3, 4:
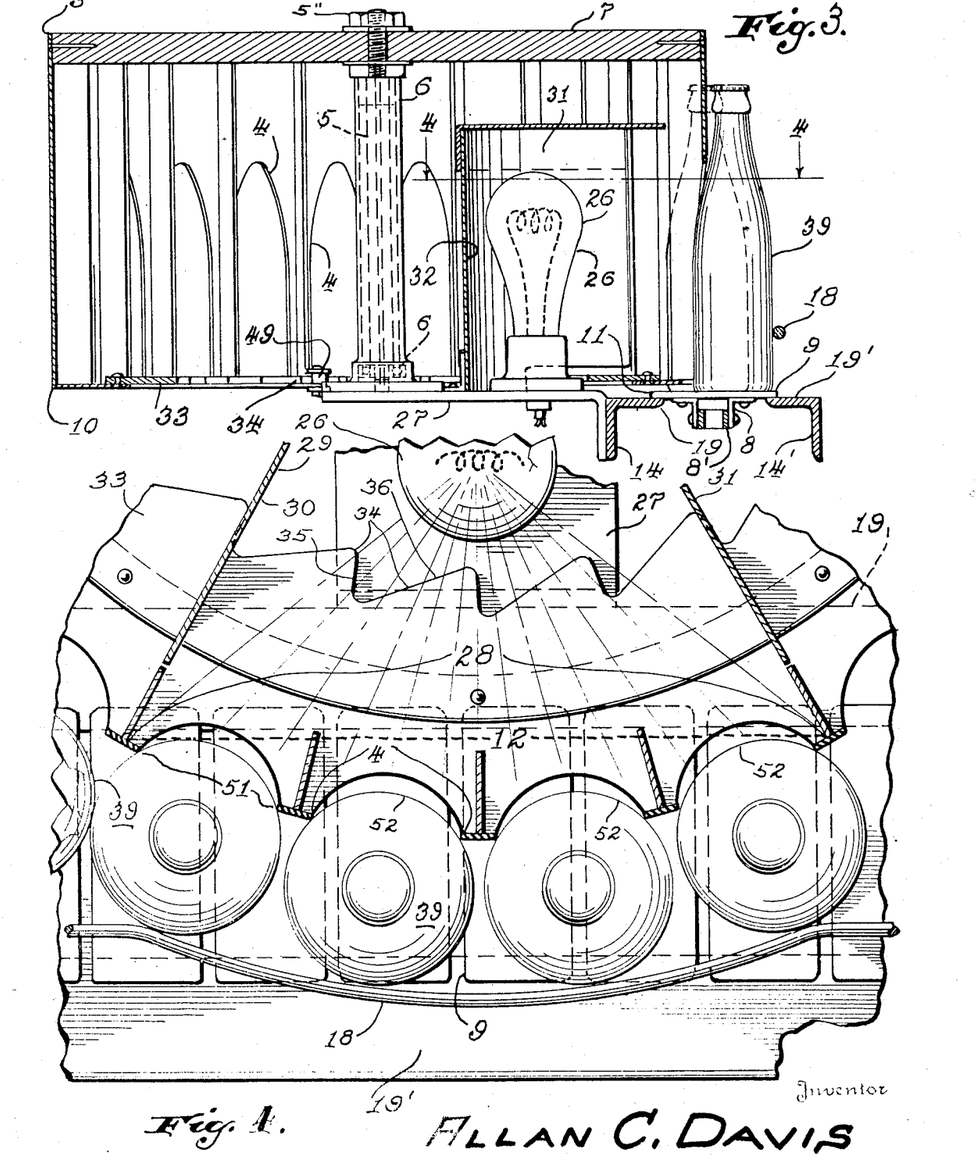
Fig. 3 is a section on the line 3—3 in Fig. 1, looking in the direction of the arrows in the latter figure, scale enlarged.
Fig. 4 is a fragmentary horizontal section on the line 4—4 in Fig. 3, looking downwardly as indicated by the arrows and further enlarged.

The drum 1 including screen 3 co-operates with a conveyor 8 shown as provided with substantially flat and approximately horizontal bottle supporting plates 9, see Fig. 3. This conveyor in the installation to which the description relates is used to transfer the bottles from a filling machine or a mixing or bottle shaking machine to the caser, the arrangement of filling machine, conveyor and caser, being known in the art, is not illustrated. Incidentally, any conveyor carrying transparent or translucent objects to be optically inspected may operate in combination with the inspection apparatus though it is particularly adapted to bottles carried in upright position. "Conveyor means" herein, relates to one or more conveyors.

The conveyor 8 is at a level slightly below the bottom edge 10, Fig. 3, of the sidewalls of the screen or drum 1, and the inner edge or side 11 of the conveyor passes beneath an edge of the drum crossing the same on the line of a chord 12, which, in the form shown, subtends a corresponding inspection arc 28 of approximately 60°, the length of arc being more or less variable and determined to suit the conditions presented.

The portion of the conveyor illustrated is preferably supported and guided on suitable guiding and supporting rails 14 and 14' shown in the form of angle irons arranged in parallel with their horizontal flanges 19 and 19' turned inwardly and spaced apart to admit the conveyor 8 and support the conveyor plates 9. The conveyor includes a conveyor chain 8'.

In the form shown, the conveyor is provided with inner and outer side guides 15 and 16 for the bottles. These side guides 15 and 16, in the form shown, the details of which are no part of this invention, are in the form of strips or bands of metal approximately an inch wide in a vertical direction and of suitable thickness, the proportions being selective and immaterial, and there are openings in the guides to provide a clear view of the bottles for inspection purposes. The openings correspond to the chord 12 and arc 28 where both guide members 15 and 16 are omitted. At this point the space or opening 17 in the outside guide 16 is bridged by a wire or narrow strip 18 which as shown is curved outwardly away from the center of the drum or screen 1 on a radius about the shaft 5, though the curvature being slight the exact form of the member 18 is immaterial, the object being to reduce the interference with the light rays passing outwardly through the bottles to the eyes of the inspector and to thus avoid undue interference with inspection. The openings 4 are referred to hereinafter as "light transmitting areas." The upright side edges of these openings cooperate with member 18 which has a guiding function, and these two agencies retain the bottles or other articles supported by the conveyor in registration with said light transmitting areas. In the preferred form of machine shown, the bottles in these openings are supported by the conveyor, but it is not intended to exclude the possibility that they may be otherwise supported.

The inner guide 15 also has a corresponding opening 15' where it would if continued intersect the path of the side wall or screen wall 3 of the drum 1 which, in the inspection operation, is in rotation as hereinafter described. Guide 15 is approximately in line with chord 12 and the opening is slightly longer to provide freedom of movement for drum 1.

The side guides 15 and 16 are suitably mounted on the rails 14, 14' and said side guides 15 and 16 are adjustable laterally as to their spacing to accommodate bottles of various diameters, the adjustment which may be of any desired arrangement being indicated at 20, 21, 22 and 23, and the brackets supporting the side guides at 24.

In operation, as hereinafter described, the drum or screen 1 rotates counter-clockwise as indicated by arrows in Figs. 1 and 5, such rotation being dependent on the direction of motion of the conveyor 8, which, as shown, is from left to right in said Figs. 1 and 5, said direction of rotation being also dependent on the relation of the conveyor to the drum.

A source of light or light bulb 26 is supported within the drum on a bracket 27 or in any suitable manner, the light 26 being shown between the chord 12 and the shaft 5. As shown, bracket 27 is mounted on conveyor supporting rail 14. The purpose being to pass light rays through the bottles to the inspector's eyes.

In the preferred form of the invention, the inspection area comprises the arc 28 of the endless screen wall 3 of the screen or drum 1. This arc 28 which is approximately the arc subtended by the chord 12 which is the inner edge of the conveyor path is enclosed by stationary screen 29. This screen 29 may be supported on the bracket 27 in any suitable manner. Screen 29 is approximately V shaped with its vertex toward the drum axis and enclosing the source of light or light bulb 26 near said vertex. The screen 29 has radial side walls 30 and 31 connected in the form shown by a curved portion 32 concentric with or partially encircling the bulb or light source 26. This curved portion 32 in place of a pointed vertex gives the screen 29 an outline which avoids shaft 5 and bearing 6. These and other details are subject to a considerable degree of variation. Screen 29 may have its internal surface of reflecting quality.

The screen is controlled by the follower 49 and positioning surfaces 35 to move with a step by step motion, the openings being located in turn in positioning relation to the conveyor at the end of each step, it being difficult to determine whether the screen comes to a full stop after each step. At each stop the screen is positioned with an opening 4 ready in line to receive the next bottle presented by the conveyor 8. In the form shown the drum or screen 1 is open at the bottom having at the bottom edge of the wall 3 an inwardly disposed ring 33, this ring being provided at its inner edge with positioning means shown in the form of notches 34, and intervening teeth 38. These notches 34 have each a radial or equivalent engaging surface 35 on the forward side of a corresponding tooth 38 and an inclined or other convenient releasing surface 36 on the rear side of each tooth and on the opposite side of each notch 34 from the engaging surfaces 35. The radial surfaces 35 are the positioning or engaging or stop surfaces of positioning ring 33. Other positioning and stopping agencies or timing means may be substituted for the teeth shown. Notches 34 are also referred to as stopping or positioning agencies.

The bottles are indicated by reference character 39. As delivered from the filling or mixing machine, they are normally spaced apart on the conveyor 8 by a distance corresponding to the relative speeds of the conveyor and the filling or mixing machine. However, due to various incidents in filling and mixing or shaking this spacing is very irregular. At times the spacing is fairly uniform and at other times, there are long spaces between the bottles. While the machine is intended to compensate for these irregularities, it may be used without regard to the operation of such machines.

The positioning mechanism also includes other features. The machine, as shown, in Figs. 1 and 2, comprises a detector 40 shown as including a bell crank lever 41 pivoted at 42 on the conveyor rail or support 14 or other suitable stationary support.

This lever has an arm 43 shown as extending in the direction of, i. e., approximately parallel to the conveyor 8 and provided at its forward end with a roller 44. The other arm of the crank lever 41 is indicated at 45 and as shown extends at right angles to arm 43 away from the observer and outwardly from the side of the conveyor support on which the drum is located. This latter arm has pivotally connected to its outer end a tension member 46 which extends to the observer's right across the bottom of the drum or screen 1, being connected at its opposite or right hand end to a control lever or brake lever 47 pivoted on the support or guide 14 at 48, the form, arrangement and details, as aforesaid, being subject to wide variation.

This control or brake lever 47 may be, as shown, approximately parallel to the detector lever arm 46 and carries at its outer end a follower or stop member 49. The lever 47 is normally drawn toward the toothed member 33 as by a spring 50 and continuous pressure is thus, or in any suitable manner, applied to lever 41 whereby roller 44 follows the contour of the bottle sides, tending to enter between bottles 39 at the left of arc 28 and the stop or positioning and timing follower 49 vibrates in correspondence with said contour and tends to enter each notch 34 which happens to be in its path thus establishing contact of stop or positioning member 49 with the positioning surface 35 of said notch. The surfaces 35 are so placed in relation to the openings 4 in the screen drum 1, that when any surface 35 or notch 34 is engaged or entered by follower 49 an opening 4 is in line with conveyor 8 at the left end of inspection arc 28 so that each opening 4, is positioned to receive a corresponding bottle. The motion of the screen is a step by step motion and after each step the screen drum 1 is thus positioned by cooperation of a positioning surface 35 with follower 49, or vice versa, follower 49 being advanced into notch 34 by the spring 50. Later it is withdrawn from said notch by the action of bell crank 41 which is forced outwardly or rotated counter-clockwise about its axis by engagement of stop 44 with a bottle 39. This motion through connection 46 withdraws stop follower 49 from engagement with a tooth 39 or notch 34 and particularly a positioning surface 35, thus releasing the drum or screen 1 and permitting it to rotate in response to the impulses imparted to it by the bottles as hereinafter described whereby an accurate relation of the openings or areas 4, and bottles 39, as presented to the screen is maintained.

In operation the conduct of the mechanism depends somewhat on the strength of the spring 50 which in the form shown exerts a slight braking tendency which depends for its extent, and effectiveness on the tension of the spring and on the weight of the bottles. Additional braking means may be used.

The operation of the machine, i. e., the movement of the drum or other endless light screen 3 is dependent on the presence on the conveyor 8 at the left of the roller 44 in Fig. 1 of enough bottles to exert sufficient friction on the conveyor plates 9 to overcome spring 50 and expel the roller 44 from the line of bottles by pressure of the bottle adjacent the roller 44 on the left against said roller. It is of interest that the bottle openings 4 in the inspection arc 28 are always filled in the normal operation of the machine. Thus, each opening 4 passing any point corresponds to a filled bottle. The total number of these openings in the drum may correspond to the number of bottles in a case and by means of a counter hereinafter described and shown in Fig. 5, the number of bottles inspected and approximately the number of cases filled may be automatically recorded by merely counting the revolutions of the drum.

In operation the apparatus being arranged as shown in Figs. 1, 2, 3 and 4, the bottles being fed along the conveyor 8, each bottle 39 in turn coming from the left enters and fills a corresponding opening 4 as shown at 51 in Fig. 4, the drum being operated by the engagement of the bottles with openings 4 therein and the friction of the bottles on the conveyor. The drum 1 is thus turned in counter-clockwise rotation. An element in this operation is the weight of the bottles and the degree of friction of the bottles on the conveyor and the opposed resistance of the drum and detector member 44 which is an anti-friction roller spaced from another roller 44'' placed across the ways to reduce the resistance of the bottles in passing. Usually, a fixed number of bottles 39 as two to four bottles will accumulate on the conveyor 8 at the left of the inspection arc 28 before the friction of these bottles on the conveyor becomes sufficient to cause them to pass the detector or follower member 44 and to move the drum 1 against whatever resistance may be offered. When this occurs, however, in the machine as equipped in Fig. 1, the drum 1 turns with comparative rapidity its circumferential speed being equal to the speed of the conveyor 8 and this continues until all or nearly all of the bottles thus accumulated as at the left in Fig. 1 have been passed into the inspection arc 28, to be carried onwardly therefrom along the conveyor. As soon as the continuous line of bottles is exhausted or nearly so the bottles on the conveyor again come to the feeler or roller 44 in spaced relation the feeler 44 enters well into the path of the bottles and the spring 50 causes the positioning stop member or follower 49 to enter into a notch 34 and to engage radial wall 35 of said notch, thus instantaneously stopping the rotation of the drum 1 until the accumulation of the bottles on the conveyor is again sufficient by weight and friction thereon to exclude the follower 44 from the line of bottles thus releasing the positioning lock 35, 47, 49, 50, providing for further rotation of the mechanism.

The follower 44, enters the path of the bottles to a slight extent between each pair of successive bottles, causing the member 49, to enter to some extent into each notch 34, maintaining the relation of the drum openings 4, in the screen to the bottles on the adjacent portion of the conveyor, at 39, substantially as in Figure 1. The followers 44 and 49, and radial walls or surfaces 35, and the notches 34, are referred to hereinafter as co-operating stop means, and also as positioning means as they serve both functions.

So far as can be ascertained from observation of the operation of the machine, the screen moves normally with a step by step motion, the positioning of the openings 4 due to engagement of follower 49 with each positioning surface 35 in turn taking place between the steps, it being difficult or impossible to ascertain whether the screen comes to a full stop between steps, and it is believed that the follower 49 enters more fully into the notches 35, 36, 37 when the screen is stopped to permit the bottles to accumulate than it does in the regular positioning operation, i. e., when the screen is advancing with its step by step motion.

It may be noted at this point that the inspector observes the bottles in the arc 28 subtended by chord 12 and sees the contents thereof by the light transmitted through the bottles and their contents from the bulb 26, the operator being located in front of the machine and looking at the bottles from the position of the observer in Fig. 1. It is also noted that bottles and other containers of a transparent or translucent nature containing more or less transparent or translucent products and other transparent or translucent articles may be inspected. It is further noted that while operation by the forward tendency of the bottles is preferred the control 35, 40, 41, 44, 47, 49, may, if desired, be otherwise utilized taking the power for operation of the screen from a different source.

While the operation of the machine as thus described is regarded as effective, there is a tendency to operation for short periods at speeds greater than is necessary for delivery of the bottles at the rate per unit of time at which they are handled by the machine, and between such periods of operation at excess speeds the machine is idle for a few seconds and the inspection stops. The stops represent periods of lost time and the increased speed in the alternate periods tends to make the work difficult for the inspector and to decrease the efficiency of inspection.

Figure 5:
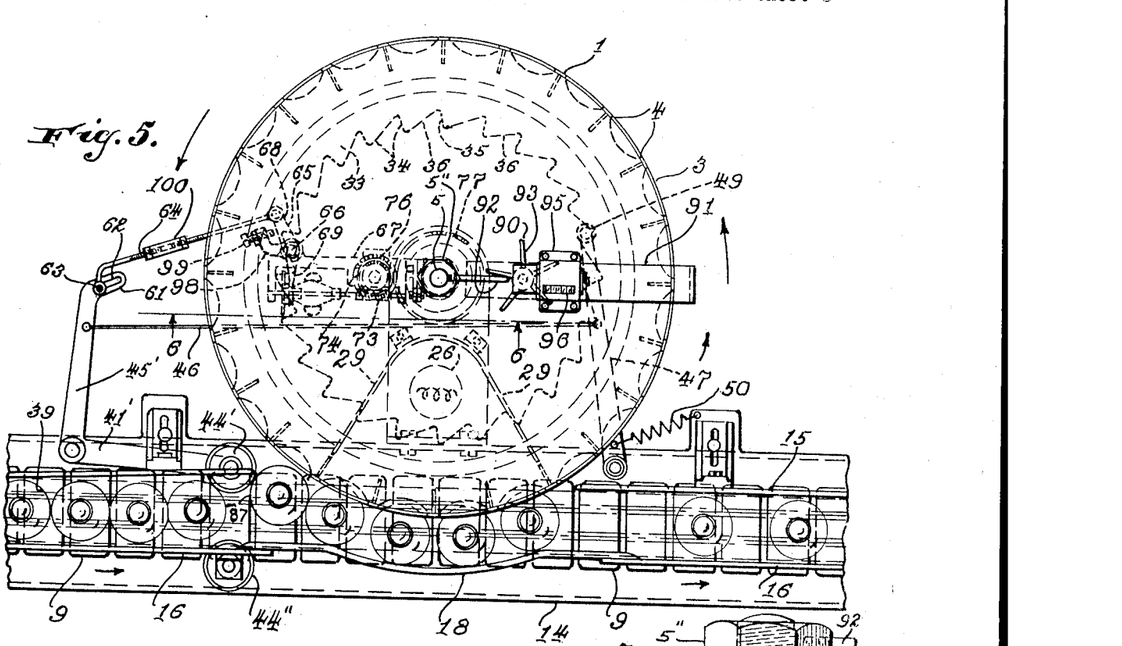
Fig. 5 is a top plan view of a modified or speed controlled form of the machine.
Figure 6:
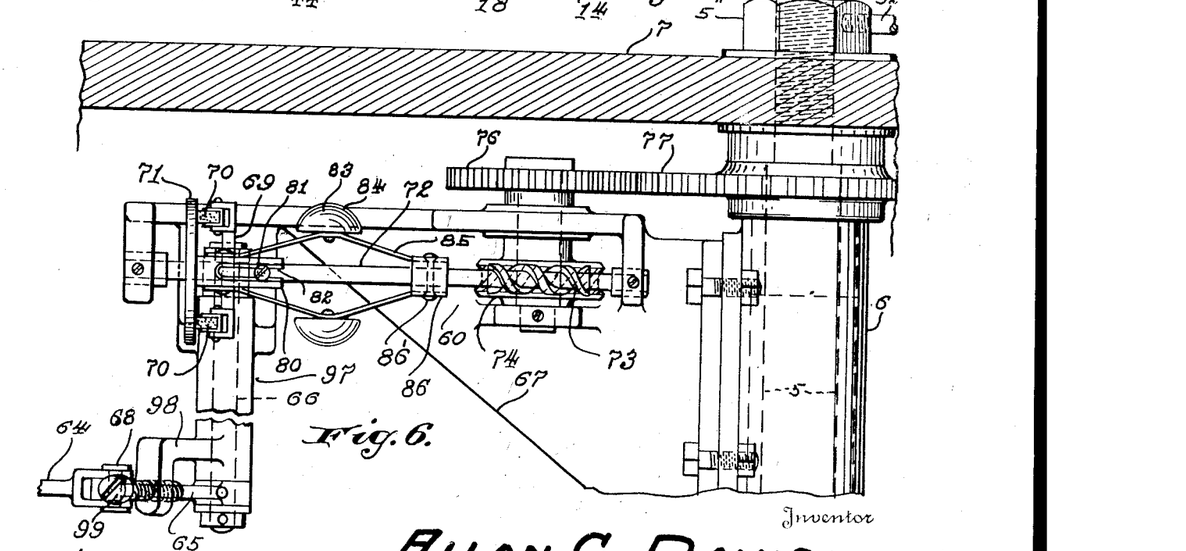
Fig. 6 is an enlarged section on the line 6—6 in Fig. 5.

Figs. 5 and 6 illustrate a modified form of the machine showing the application of a governor 60 or equivalent mechanism to the apparatus. This governor overcomes the tendency of the machine to speed up in the manner described when a sufficient number of bottles to operate the machine has been accumulated on the conveyor at the intake end of the inspection apparatus.

While the maximum peripheral speed of the inspection apparatus cannot, in the form shown, exceed the speed of the conveyor, this speed is generally too great for convenient or satisfactory inspection and too great to permit of any approach to continuous operation as the supply of bottles fed to the inspection apparatus is at times exhausted causing the machine to stop. By reducing the maximum speed of the inspection apparatus the tendency to frequent pauses in the operation and consequent loss of time of the machine and the inspector is reduced. The governor by reducing the maximum speed of operation gives a speed at which inspection is more easily and efficiently performed. This reduction of the maximum speed tends to give and does give more continuous operation and due to the provision of a braking device the stops when they do occur are gradual.

In the form of machine shown in Figs. 5 and 6 the bell crank arm 45' which corresponds to the arm 45 of bell crank lever 41 in Fig. 1, has been extended to provide a tip 61 which is inclined outwardly from the support 14 and to the right of the observer and this tip or extension 61 is slotted at 62 in the direction of its length to receive a pin 63 whereby this lever arm 45' is connected as by means of a connecting rod 64 to a lever 65 pivoted near its center at 66 on a stationary bracket 67. This bracket, as shown, is supported on the bearing tube 6 of shaft 5. The connecting rod 64, the length of which may be adjustable, is connected to an arm 68 of said lever 65, lever 65 is also provided with an arm 69 projecting on the side of fulcrum 66 which is opposite to arm 68. This arm 69 carries at its outer end vertically spaced brake shoes, shown in the form of rollers 70, see Fig. 6. The position of rollers or brake shoes 70 is controlled by the arm 45' of bell crank lever 41'. The position of said arm is in operation determined by a roller 44' which engages in turn the bottles 39 on the conveyor 8 as they are about to enter seats or openings 4 as in the machine previously described in connection with Figs. 1 to 4. The brake shoes 70 engage a disc 71 mounted on and rotating with a governor shaft 72. This governor shaft is, in the form shown, driven by a worm 73 of steep pitch which is in turn driven by a worm wheel 74 mounted on the shaft of a small toothed pinion 76 which meshes with and is driven by pinion 77 on the shaft 5 of the drum 1.

The disc 71 is mounted on a sleeve 80 which slides on the shaft 72 being keyed thereto in any suitable manner as by screw 81 in a slot 82. The screw 81 is seated in the shaft 72 and engages the slot 82 in the sleeve 80. The sleeve 80 is secured to disc 71 and the positions of the sleeve and disc respectively are controlled by a centrifugal governor device 83 of a familiar type the same consisting of weights 84 mounted on flexible straps 85 secured to the shaft 72 by a collar 86 pinned to the shaft at 86'. The flexible straps 85 are connected at their ends opposite to collar 86 to the sleeve 80. Other types of governor are usable.

The positioning lock 46, 47, 48, 49, 34, etc., of the previous disclosure or any suitable positioning means is preferably included in this apparatus. The drum 1 may be driven by the friction of the bottle on the conveyor as already described or by any suitable friction or equivalent connection thereto.

As the drum 1 tends to speed up, or to increase its speed, the centrifugal action of the governor in the form shown draws the disc 71 or gives it a tendency to the right and presses it against the brake shoes 70. The latter being mounted on the stationary bracket 67 and the disc 71 being secured to the shaft 72 rotating with the drum, the tendency is to reduce the speed of the drum 1. The braking contact 70, 71 is also partially controlled by the bottles, or detector roll 44' which, so long as it is in contact with the bottles 39, tends to swing the lever 65 counter-clockwise reducing the braking contact and permitting the machine to continue, i. e., permitting the drum to continue to rotate but at a reduced speed as compared to that of conveyor 8. However, as soon as the line of bottles on the conveyor, at the left of 44', is broken by reduction of the supply of bottles below the amount necessary for continuous operation and the detector roller 44', opposite anti-friction roller 44'', enters a space as at 87 between the bottles on the conveyor, the arm 45' tends to swing to the right and the lever 65 rotates to a slight degree in a clockwise direction. The braking contact being thus increased at 70, 71, the drum is slowed down and stopped being positioned by engagement of the stop member or roller 49 with a notch 34 and particularly with a positioning surface 35 whereby one of the openings 4 in the drum 1 is located in proper alignment with the conveyor 8 and guides 15; 16 to receive the bottle next presented.

It should be noted at this point that bearing 97 for fulcrum pin 66 is provided with a stop arm 98 carrying stop screw 99 in the path of arm 68. The screw 99 together with turn buckle 100 and slot 62 provide for precise regulation of the movement of the brake shoes 70 in co-operation with disc 71 whereby the exact regulation of the maximum speed of the drum is attained. By advancing screw 99 the maximum speed of the drum is reduced. The turn buckle 100 compensates for this adjustment enabling roller 44' to pass the bottles. Slot 62 provides the necessary degree of lost motion between lever arm 45' and the rollers 70. By advancing the screw 99 the extent to which the rollers may be withdrawn from the disc 71 by detector mechanism 41', 44', 45' is reduced, reducing the drum speed at which the disc 71 moves against the rollers 70. Turn buckle 100 provides adjustment of the detector lever arm 45' and roller 44' relatively to lever 65 and hence relatively to stop screw 99 so as to give the proper spacing of roller 44' from roller 44'' when stop screw 99 has been advanced to permit the bottles to pass said rollers. Slot 62 gives a predetermined lost motion of lever arm 45' relatively to thrust rod 64 and thus reduces the motion transmitted to lever 65 between the extreme positions of lever arm 45', and thus reduces the throw of lever 65 in response to the contact of roller 44' with an advancing bottle. This happens after each stop of the screen due to a space between said bottles 39 into which space roller 44' has entered, as described.

To continue with the description of the operation, after each stop, as soon as a supply of bottles is accumulated on the conveyor at the left of roller 44', said supply being sufficient to provide by their weight and contact with the conveyor the degree of friction necessary to expel the detector 44' and to thus release the positioning means and/or brake permitting the drum to start, the operation is repeated. The governor not only reduces the speed of the screen but through disc 71 and lever 65 and rod 64 retards the advance of follower 49 into notch 34 by directly opposing the tendency of spring 50 to advance said follower.

A satisfactory degree of continuity of operation is attained by the reduction and/or equalization of the speed of the screen and hence of the bottles, and any tendency to a bumping or jerking motion due to undesired contact of follower 49 with points 37 of successive teeth 38 or other causes is avoided, the operation being so efficient that a single inspector can, without undue fatigue or other harmful result, work for many hours at a stretch inspecting with satisfactory results the product of an entire line of machines.

As already suggested, it may be considered desirable to have the number of openings 4 in the drum 1 correspond to the number of bottles in a case so that the openings 4 being all filled at each rotation, the number of cases or the number of bottles inspected can be recorded by merely counting the revolutions of the drum 1, it being important to note, as already pointed out, that in normal operation at each revolution of the drum, each bottle opening 4 receives and presents for inspection a corresponding bottle.

To accomplish the bottle and case counting operation, a star wheel or counter wheel 90 has been mounted on an upright axis on any suitable support as bracket 91. The star wheel or counter wheel 90 is shown as immediately adjacent the drum shaft 5 which is provided with a counter arm 92. In this connection it may be noted that the star wheel 90 is provided with five projecting arms 93. The path of each of these arms intersects the path of the shaft arm 92 whereby the star wheel 90 is turned one fifth of a revolution for each revolution of the drum 1. The bracket 91 also supports a suitable counter mechanism 95 which is connected to and operated by the star wheel 90. The said mechanism being suitably calibrated at 96 the number of bottles inspected over a long period can be automatically recorded and, if desired, the number of cases filled can be directly indicated. In this connection, it may be noted that bottles excluded by the inspector are replaced by bottles taken from the conveyor at the left of the inspection apparatus, instantaneously inspected and placed in the vacant position in the case.

I have described a preferred and a modified form of my invention, the description being specific and in detail in order that the manner of constructing, applying, operating and using the invention may be fully understood, however, the specific terms used herein are used descriptively rather than in a limiting sense, the scope of the invention being defined in the claims.

What I claim as new and desire to secure by Letters Patent is:

1. In a machine for the inspection of objects of light transmitting quality, a light intercepting screen mounted to move on an endless path having changes of direction, the screen having openings spaced in the direction of said path to receive and retain said objects, conveyor means for said objects extending adjacent said openings in approximate coincidence with a portion of said path and to and from said portion, and adapted to support said objects in said openings in said portion of the path, a source of light adapted to project light rays through openings in said portion of the path, means co-operating with the conveyor means for guiding the objects on the conveyor into said openings and for retaining them therein, the engagement of said objects with the conveyor and the contact thereof with the screen serving to move the screen along said path whereby each opening in turn is filled and closed by a corresponding one of said objects and said objects are passed along said portion of the screen path and through said light rays.

2. In a machine for the inspection of objects of light transmitting quality, a light intercepting screen mounted to move on an endless path having changes of direction, the screen having openings spaced in the direction of said path to receive and retain said objects, conveyor means for said objects extending beneath said openings, in approximate parallelism with a section of said path and to and from said section and adapted to support said objects in said openings in said section, a source of light projecting rays through the openings in said section, means for guiding the objects on the conveyor in contact with the screen and into said openings, the engagement of said objects with the conveyor and the contact thereof with the screen serving to move the screen along said path whereby each opening in turn is filled and closed by a corresponding one of said objects and said objects in said openings are passed through said light rays, braking means for said screen and a speed governor operated in timed relation to the screen and controlling said braking means to keep the speed of the screen below the speed of the conveyor.

3. In a machine for the inspection of objects of light transmitting quality, an upright light intercepting screen mounted to move on an endless path having changes of direction, the screen having openings spaced in the direction of said path to receive and retain said objects, conveyor means for said objects extending adjacent said openings in approximate parallelism with a section of said path and to and from said section and serving to support said objects in said openings in said section, a light source in light transmitting relation to the openings in said section and adapted to transmit light rays through said openings, means for guiding the objects on the conveyor in contact with the screen and into said openings whereby each opening in turn is filled and closed by a corresponding one of said objects and said objects are passed through said rays, and a stationary light screen to confine the light from said source to the said section of said screen which co-operates with the conveyor.

4. In a machine for the inspection of objects of light transmitting quality, an upright light intercepting screen mounted to move on an endless path having changes of direction, the screen having openings spaced in the direction of said path to receive and retain said objects, conveyor means for said objects extending adjacent said openings in approximate parallelism with a section of said path and to and from said section and serving to support said objects in said openings in said section, a source of light in light transmitting relation to said section and adapted to project rays of light through the openings in said section, means for guiding the objects on the conveyor in contact with the screen and into said openings, the engagement of said objects with the conveyor and the contact thereof with the screen serving to move the screen along said path whereby each opening in turn is approximately filled and closed by a corresponding one of said objects and said objects are passed through said light rays, and means for controlling and determining the maximum speed of the screen and keeping it below that of the conveyor.

5. In a machine for the inspection of objects having transparent qualities, a rotary drum having a peripheral light intercepting screen wall provided with openings spaced in the direction of the length of said wall, a source of light within the drum, stationary means confining the light from said source to a short arc of said screen conveyor means aligned with the chord corresponding to said arc and extending adjacent the openings in said arc and adapted to support objects in the openings in said arc and leading to and from said arc for feeding said objects to said openings and removing them therefrom and means for confining said objects to said openings throughout said arc.

6. In a machine for the inspection of objects having transparent quality, a drum mounted to rotate and having a peripheral light intercepting screen wall with openings spaced in the direction of the periphery to receive the individual objects to be inspected, a source of light adapted to project rays through some of said screen openings, conveyor means providing a support adjacent said lighted openings within an arc of said drum and adapted to retain said objects in said respective openings and to bring said objects to said openings and having means for guiding said objects to the openings at one end of said arc and into contact with said drum, the conveyor means being connected in driving relation to the drum by contact of the said objects on the conveyor means with the drum.

7. In a machine for the inspection of objects having transparent quality, a drum mounted to rotate on an upright axis and having a peripheral light intercepting screen wall with openings spaced in the direction of the periphery to receive the individual objects to be inspected, a source of light within the drum, conveyor means for said objects, said conveyor means extending beneath said openings within an arc shaped portion of the screen path, said conveyor means carrying said objects to and from said arc and being adapted to lead said objects to and to support said objects in said openings, the conveyor serving to operate the drum by contact of the said objects on the conveyor with the drum and a speed governor for limiting the maximum speed of said drum to a speed below that of the conveyor.

8. In a machine for the inspection of objects having transparent quality, a rotary drum turning on an upright axis and having a peripheral light intercepting screen wall with openings to receive said objects and to be closed thereby, a source of light within said drum tending to project light rays outwardly through said openings said openings extending through the bottom edge of said wall, conveyor means extending beneath said opening along a predetermined short arc of the path of said screen and adapted to carry said objects to and from said arc, the conveyor means being approximately parallel to the chord corresponding to said arc, and means for guiding the objects on the conveyor means to the openings at one end of said arc.

9. In a machine for the inspection of objects having transparent quality, a screen mounted to move on an endless path and having a peripheral light intercepting screen wall with openings to receive said objects and to be closed thereby, a source of light tending to project light rays through said openings, conveyor means extending adjacent said openings along a predetermined short section of said screen path and adapted to carry said objects to and from said section and to carry them therethrough, the objects on the conveyor contacting and serving to advance the screen, means for guiding the objects on the conveyor means to the openings at one end of said section and means to retain them therein, and detector means tending to enter between the objects on the conveyor approaching and immediately adjacent said section, a speed governor operated by the screen and a brake for said screen connected to and controlled by said governor to be applied at predetermined speeds of the screen, approaching the speed of the conveyor, said detector being connected to said brake to increase the braking effect when the detector enters between said objects.

10. In a machine for the inspection of objects having transparent quality, an upright light intercepting screen mounted to move on an endless path and having a peripheral screen wall with openings to receive said objects and to be closed thereby, a source of light tending to project light rays through said openings, said openings extending through the bottom edge of said wall, conveyor means beneath the bottoms of said openings along a predetermined short section of said path and adapted to carry said objects to and from said section, means for guiding the objects on the conveyor means to the openings at one end of said section, and means retaining them therein, the said objects providing a driving connection between the conveyor and said screen, a speed governor and brakes for said screen connected to said governor to be controlled thereby and tending to regulate the maximum speed of the screen.

11. In a machine for the inspection of objects having transparent quality, a rotary light intercepting screen having a peripheral screen wall with openings to receive said objects and to be closed thereby, said screen moving on a predetermined path a source of light tending to project light rays through said openings, said wall being open at the bottoms of said openings, conveyor means extending beneath the bottoms of said openings along a predetermined short arc of said path, means for guiding the objects on the conveyor means into the openings at one end of said arc, whereby said openings are approximately closed said conveyor being adapted to lead the objects to said arc and to support them therethrough, the objects in the openings in said arc providing a driving connection from the conveyor to the screen, whereby each opening in said arc is filled the openings in the screen being of a predetermined number and counting means operable in time with the screen to indicate the number of rotations of the same and hence the number of bottles fed through the machine in suitable units.

12. In a machine for inspecting transparent objects a light intercepting screen mounted to move on a predetermined path and having openings for said objects spaced in the direction of said path, conveyor means for said objects extending adjacent a relatively short portion of said path and serving to lead objects to and to retain said objects in said openings through said portion of the path and means for passing light rays through said openings in said portion of the path and through the objects in the openings in said portion to a location convenient for inspection.

13. In a machine for inspecting transparent objects, a light intercepting screen mounted to move on a predetermined path and having light transmitting areas spaced in the direction of said path, means for positioning the objects in registration with said areas, comprising conveyor means extending along and closely adjacent a short portion of said path and adapted to lead said objects to and support them in registration with the said areas in said portion of the path and to remove them therefrom and a source of light projecting rays through the light transmitting areas in said portion of the path to a point of reception convenient for inspection, and a governor connected to and moving in correspondence with the screen and braking means connected to and operated by the governor to control the maximum speed of the screen regulating said maximum speed for convenience of optical inspection.

14. In a machine for inspecting transparent objects a light intercepting screen mounted to move on an endless path, said screen having light transmitting areas spaced in the direction of said path, means for locating the objects in registration with said areas, comprising conveyor means for carrying the objects, extending along a section of said path in object supporting relation to the areas in said section and to and from said section, guiding means for the objects cooperating with the conveyor and screen at and adjacent said section whereby the objects transmit motion from the conveyor means to the screen and the objects are brought into registration with the said areas at one end of said section and are carried in registration with said areas along said section of the path and delivered therefrom and a source of light in light transmitting relation to said section whereby rays of light are passed through said areas in said section and through said objects to a point of reception for purposes of inspection.

15. In a machine for the inspection of objects of light transmitting quality, an upright light intercepting screen mounted to move on an endless path, the screen having openings spaced in the direction of the length of said path to receive and retain said objects, conveyor means for said objects extending beneath said openings in approximate coincidence with a short section of said path and to and from said section, to bring the objects to said openings in said section, the conveyor means serving to support the objects in said openings and to remove them therefrom, a source of light in light transmitting relation to said section to pass light rays through openings in said section, means for guiding the objects on the conveyor means into contact with the screen and into said openings, whereby each opening in turn is closed by a corresponding one of said objects and said objects are passed through rays from said light source, detector means engaged by the objects on the conveyor as they approach the screen, said detector means comprising a detector member and actuating means applying an operating tendency to the detector member whereby said member enters between said objects, said screen having a series of positioning means, one corresponding to each opening and cooperating positioning means connected to the detector member and controlled thereby to engage said screen positioning means in turn to position the screen with each said opening in turn in receiving relation to a corresponding object on the conveyor, the operating tendency applied by said actuating means being limited to yield to the advancing tendency of a predetermined number of objects on the conveyor whereby the positioning means and detector serve to stop the screen when the supply of objects on the conveyor is below said predetermined number.

16. In a machine for the inspection of objects having transparent quality, a drum having its wall upright and mounted to move on a continuous path, said wall being in the form of a light intercepting screen with openings spaced in the direction of its length to receive the individual objects to be inspected, a source of light within the drum, conveyor means for said objects, said conveyor means providing a bottom wall for said openings throughout a portion of the path of said screen wall, and also leading to and from said portion of the path, means for guiding said objects to the openings at one end of said portion and into light intercepting relation with the respective openings, the conveyor being connected in driving relation to the drum by contact of said objects on the conveyor with the drum, detector means engaging said objects on the conveyor as they approach said portion of the drum path, the detector having actuating means whereby it enters into spaces between the objects, the contour and spacing of said objects giving the detector a vibratory motion, and means connected to the drum and comprising positioning means corresponding to each opening, said detector having means connected thereto and engaging said positioning means for placing said respective openings in turn in receiving relation to the respective objects on the conveyor.

17. In a machine for the inspection of objects having transparent quality, a light intercepting screen mounted to move on a predetermined continuous path, said screen having openings spaced in the direction of its length to receive the individual objects to be inspected, a source of light projecting its rays through said openings, conveyor means for said objects, said conveyor means extending adjacent said openings throughout a portion of the screen path and serving to lead said objects to and from said portion of the path, means for guiding said objects to the openings at one end of said portion of the path and into contact with said screen, the objects remaining on the conveyor means throughout said portion of the path, the conveyor means serving to operate the screen by contact of said objects on the conveyor with the screen, detector means engaging said objects on the conveyor as they approach the screen and entering into the path of said objects between each two adjacent objects, means of applying a limited force to the detector means whereby it enters between the objects as foresaid, whereby a predetermined supply of objects on the conveyor approaching said screen serves to expel the detector from said path and positioning means connected to the screen and having positioning surfaces corresponding to each opening and positioning means connected to the detector, to be operated thereby and cooperating with said first mentioned positioning means for locating said openings in turn in receiving relation to the conveyor means to receive each object in turn, said positioning means being controlled by said detector to stop the screen when the supply of objects on the conveyor is less than said predetermined number, whereby the detector is not immediately expelled from between said objects, and a speed governor for limiting the maximum speed of the screen to a speed below that of the conveyor.

18. In a machine for the inspection of objects having transparent quality, a screen mounted for movement along a continuous path and having a light intercepting screen wall with openings spaced in the direction of its length to receive the individual objects to be inspected, a source of light projecting its rays through said screen openings, conveyor means for said objects, said conveyor means extending adjacent said openings throughout a portion of said path, said conveyor means being adapted to carry said objects to and from said portion of the path and to support them therethrough, means for guiding said objects on the conveyor means to the openings at one end of said portion of the path and means for holding them in contact with said screen and in registration with said openings, the conveyor means being driven and serving to operate the screen by contact of said objects on the conveyor means with the screen, detector means having actuating means supplying a limited force thereto whereby it is held in contact with said objects on the conveyor means, being caused to follow the surfaces of said objects as they approach the screen, and vibrating in accordance with said surfaces and entering between said objects for short intervals and being expelled from between the objects by the advancement thereof when the supply of objects on the conveyor equals a predetermined number corresponding to said limited actuating force and remaining between said objects when the supply is less than said predetermined number and positioning means for the drum comprising means connected to and moving with the drum, and having a positioning element corresponding to each opening and means engaging said positioning elements and controlled by said detector means to position each opening in turn in receiving relation to an object on the conveyor, a brake and a speed governor controlling said brake for limiting the maximum speed of the screen and a connection from said detector to said brake tending to increase the braking action when the detector remains between said objects, thus stopping the screen.

19. In a machine for the inspection of objects having a transparent light transmitting quality, a rotary light intercepting screen having a continuous screen wall with openings to receive said objects, said openings being covered by said objects, a source of light tending to project light rays through said openings which extend through the bottom of said wall, conveyor means extending beneath the bottom of said openings throughout a predetermined portion of said path and to and from said portion, said conveyor means being adapted to lead the objects thereon to the openings at one end of said portion of the path and to support them throughout said portion, said objects on the conveyor means providing a driving connection between said conveyor means and said screen, a speed governor and a brake for said screen connected to the governor, and controlled thereby to regulate the maximum speed of the screen below the speed of the conveyor, and means comprising a detector member mounted to contact the objects approaching the screen, and means for pressing said detector member with a limited force against said objects causing it to vibrate in correspondence with the contour of said objects, and to enter between said objects and positioning means on the screen having a positioning element corresponding to each opening and cooperating positioning means connected to and controlled by said detector member to engage each said element in turn for positioning the screen with each opening in turn in receiving relation to corresponding objects on the conveyor.

20. In a machine for inspecting transparent objects, a light intercepting screen mounted to move on a predetermined path and having light transmitting areas spaced in the direction of the length of said path, means for retaining said objects in registration with said areas comprising conveyor means for said objects extending beneath a short portion of said path and serving to lead the objects to said portion and as a support for said objects in said areas throughout said portion of the path and means for passing light rays through said areas and through the objects in said areas in said portion of the path to a location for inspection.

21. In a machine for inspecting transparent objects, a light intercepting screen mounted to move on a predetermined path and having light transmitting areas spaced along said screen in the direction of said path, means for retaining said objects in registration with said screen areas comprising conveyor means for said objects extending beneath a portion of said path and also to and from said path to lead said objects into registration with said areas and also serving as a support for said objects in registration with said areas throughout said portion of the path and means for passing light rays through said areas in said portion of the path said objects providing a driving connection between the conveyor and said screen and a speed governor for controlling the screen to regulate its speed below that of the conveyor.

22. In a machine for inspecting transparent objects, a light intercepting screen mounted to move on a predetermined path and having light transmitting areas spaced along said screen in the direction of said path, means adjacent said areas for positioning said objects in registration with said areas comprising conveyor means for said objects which extends beneath a short portion of said path, said conveyor means also leading to and from said portion and serving as a support for said objects in registration with said areas, and means for passing light rays through said areas in said portion of the path and through said objects in registration with the light transmitting areas in said portion, said objects providing a driving connection between said conveyor and said screen, and a speed governor controlling the screen to reduce its maximum speed for convenience of visual inspection.

23. In a machine for inspecting transparent objects, a light intercepting screen mounted to move on a predetermined path and having light transmitting areas spaced in the direction of the length of said path, means for locating the respective objects in registration with said areas, conveyor means extending along and closely adjacent a portion of said path and adapted to lead said objects into registration with said areas in said portion of the path and to remove them therefrom and a source of light, projecting rays through the light transmitting areas in said portion of the path to a point convenient for inspection.

24. A machine as per claim 23 in which the objects moving along the conveyor means serve to transmit motion of the conveyor to the screen, detector means engaging and following the contour of the objects on the conveyor means, said objects standing with their axes upright on the conveyor means whereby the detector has a normal vibratory motion, positioning agencies, one for each said area connected to and moving in correspondence with the screen, means connected to the detector for engaging and instantaneously disengaging said agencies in turn, said engagement and release serving to locate each said area in turn in receiving relation to the conveyor means.

25. The machine of claim 23 in which the objects inspected are approximately cylindrical and stand in upright position on the conveyor means, said machine having a series of positioning agencies connected to and moving in correspondence with the screen, said agencies corresponding one to each said light transmitting area, a detector engaging the objects approaching said portion of the path and having actuating means whereby it is caused to follow the contour of said objects, and means connected to and controlled by the detector for engaging said agencies in turn as the detector enters between each pair of adjacent objects, said means serving tò control the screen motion and thus position said areas in turn in receiving relation to the conveyor means.

26. A machine as per claim 23 in which the objects inspected are approximately cylindrical and stand in upright position on the conveyor means and in which the objects on the conveyor means serve to transmit the conveyor motion to the screen, said machine having a series of positioning agencies connected to and moving in correspondence with the screen, said agencies corresponding one to each said light transmitting area, a detector engaging the objects approaching said portion of the path and having actuating means applying a limited force to the detector whereby it is caused to following the surfaces of said objects and to thus vibrate in correspondence with the contour of said objects, entering the spaces between said objects, and means connected to and controlled by the detector for instantaneously engaging and disengaging said agencies in turn at each vibration of the detector to control the screen motion and to thus position the said areas in turn in receiving relation to the conveyor means, the force applied to the detector being so determined that when the supply of objects approaching said portion of the path drops below a predetermined minimum, the detector enters between said objects whereby the detector controlled means becomes positively engaged with one said agency, stopping the screen, the increase of the supply of objects above said predetermined minimum serving to expel the detector from between the objects releasing the screen and permitting it to advance.

27. In a machine for inspecting transparent objects, a relatively opaque screen mounted to move on a predetermined path and having light transmitting areas spaced in the direction of the length of said path, means to pass light rays through said areas in a predetermined portion of said path to a point of inspection, and means for feeding objects at the beginning of said portion to said areas to pass through said portion of the path, means for maintaining each object in registration with a corresponding light transmitting area throughout said portion of the path, means for controlling the screen motion and the feeding of the objects to cause each object in turn to move into registration with one of said areas and to keep all of the light transmitting areas in said portion closed by the respective objects throughout the inspection period.

28. A machine as per claim 27, in which the screen is advanced by the feeding means, said screen having a governor for controlling the speed of the screen to an inspection speed below that of the feeding means.

29. A machine as per claim 27, in which said controlling means comprises positioning means having a positioning element corresponding to each said area and connected to the screen to move in correspondence therewith and means cooperating with each said element contacting said objects and controlled thereby for timing and positioning the screen in relation to the objects as fed, whereby each object in turn is presented to a corresponding light transmitting area.

ALLAN C. DAVIS.